United States Patent
Montagner

(10) Patent No.: US 6,996,876 B2
(45) Date of Patent: Feb. 14, 2006

(54) ELASTIC HINGE FOR EYEGLASSES

(75) Inventor: Luciano Montagner, Susegana (IT)

(73) Assignee: Ideal S.R.L., Quero (IT)

( * ) Notice: Subject to any disclaimer, the term of this patent is extended or adjusted under 35 U.S.C. 154(b) by 205 days.

(21) Appl. No.: 10/839,235

(22) Filed: May 6, 2004

(65) Prior Publication Data

US 2004/0237258 A1     Dec. 2, 2004

(30) Foreign Application Priority Data

May 29, 2003   (IT)   .......................... PD2003A0117

(51) Int. Cl.
 *G02C 5/22*   (2006.01)
(52) U.S. Cl. ........................ 16/228; 351/113
(58) Field of Classification Search .................. 16/228; 351/113, 114
 See application file for complete search history.

(56) References Cited

U.S. PATENT DOCUMENTS

| | | | | |
|---|---|---|---|---|
| 4,351,086 A | * | 9/1982 | Drlik | 16/228 |
| 5,018,242 A | * | 5/1991 | Guy et al. | 16/228 |
| 5,400,090 A | * | 3/1995 | Chen | 351/113 |
| 5,755,010 A | * | 5/1998 | Lehnert | 16/228 |
| 5,889,575 A | * | 3/1999 | Wang | 351/113 |
| 6,336,251 B1 | | 1/2002 | Sartor | |
| 6,390,620 B1 | * | 5/2002 | Montalban | 351/114 |
| 6,505,933 B1 | * | 1/2003 | Schuchard et al. | 351/113 |

FOREIGN PATENT DOCUMENTS

| | | | |
|---|---|---|---|
| DE | 000679920 A1 | * | 4/1995 |
| DE | 019856117 A1 | * | 6/1999 |
| EP | 0 628 846 A | | 12/1994 |
| WO | WO 98/43127 A | | 10/1998 |
| WO | WO 00/63739 A | | 10/2000 |

\* cited by examiner

*Primary Examiner*—Suzanne Dino Barrett
*Assistant Examiner*—Mark Williams
(74) *Attorney, Agent, or Firm*—Guido Modiano; Albert Josif; Daniel O'Byrne

(57) ABSTRACT

An elastic hinge for eyeglasses, comprising an elongated box-like body provided with an open receptacle inside which a traction elastic element and a first hinge articulation element associated with the elastic element are inserted with the first hinge articulation element arranged to slide and pivoted to a second hinge articulation element for fixing to the eyeglasses; the first and second ends having both a larger diameter than the intermediate body of the elastic element; a longitudinal milling extending on the entire length of the box-like body, and being provided with an axial hole; the length of the elastic element when inactive being substantially equal to the distance between the bottom of the axial hole and the end of the milling.

12 Claims, 3 Drawing Sheets

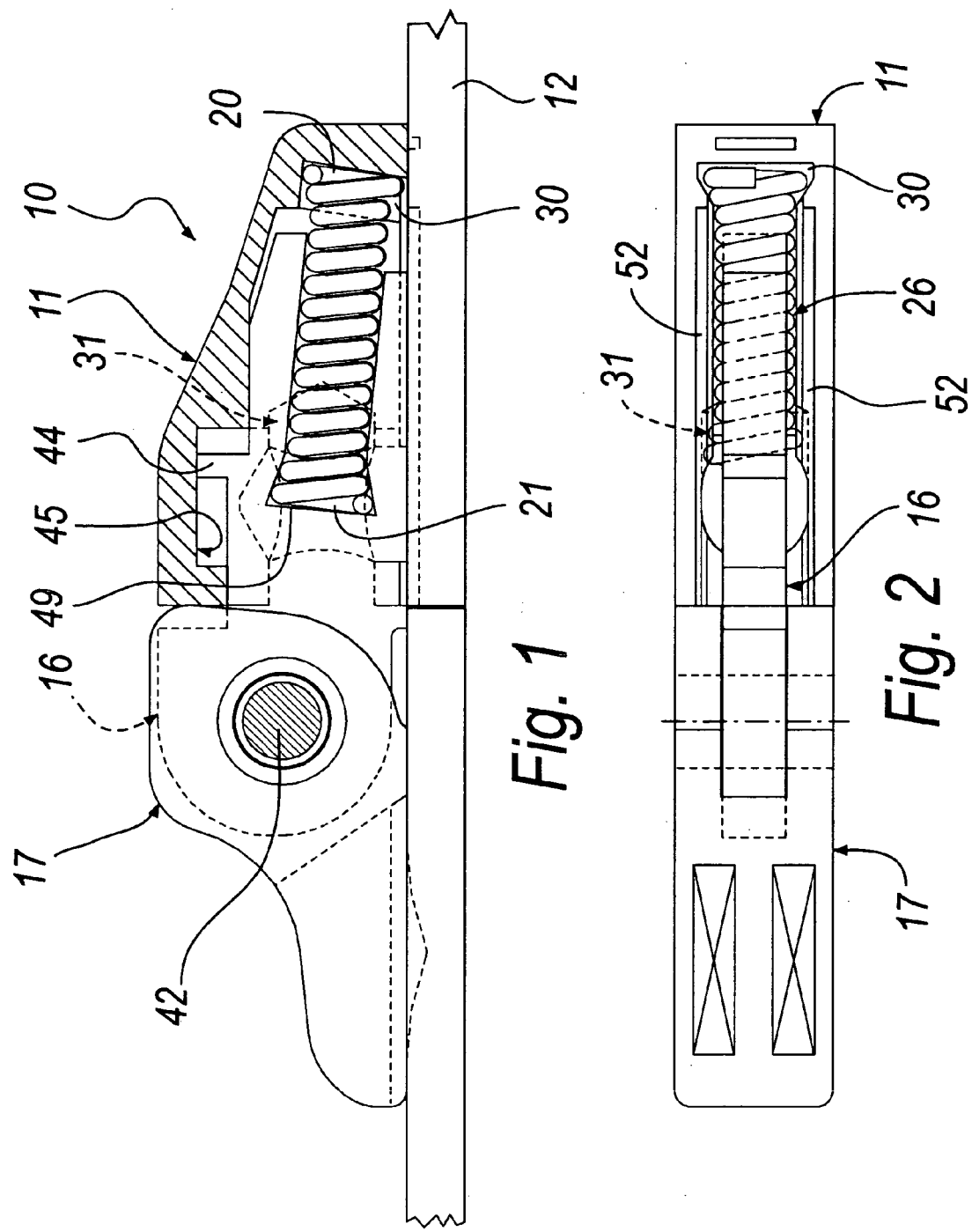

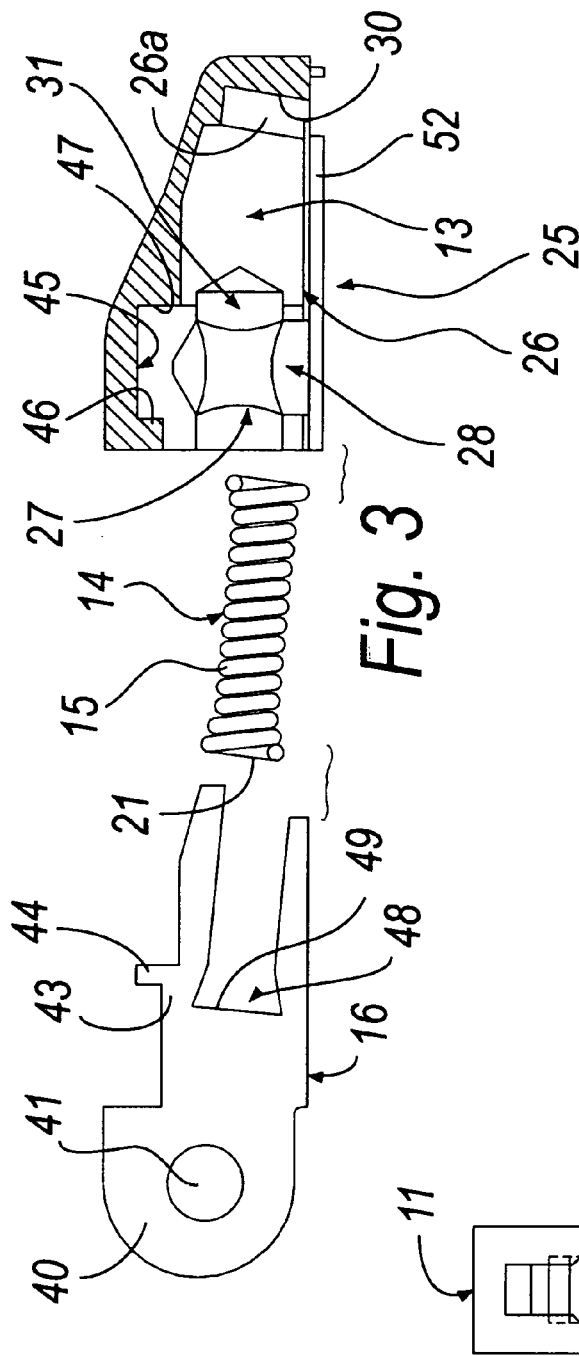
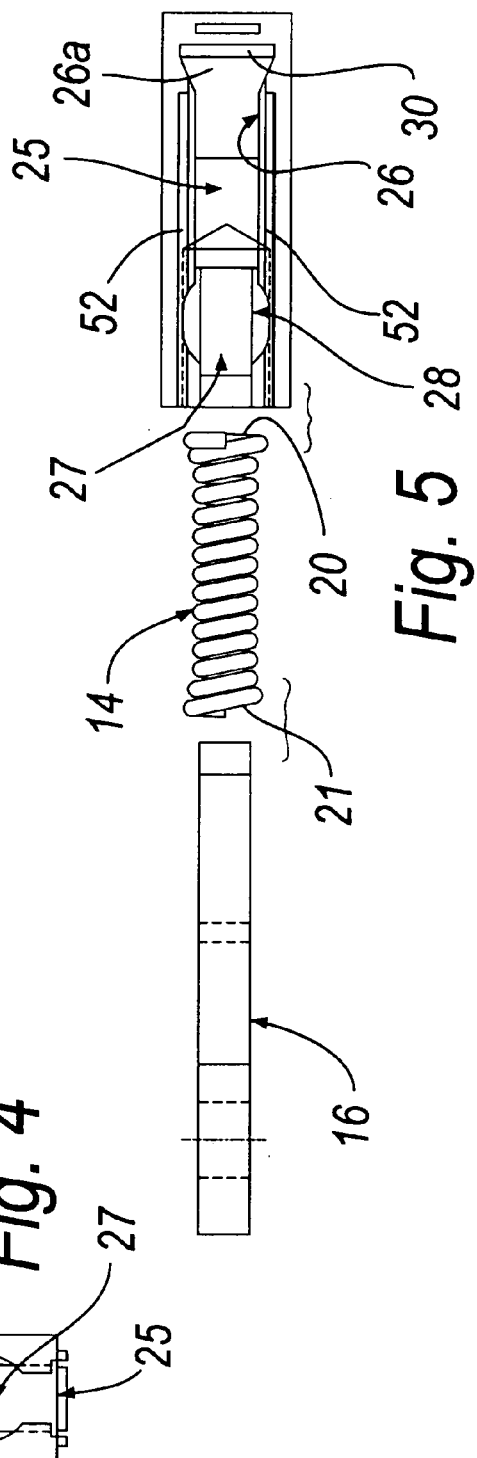

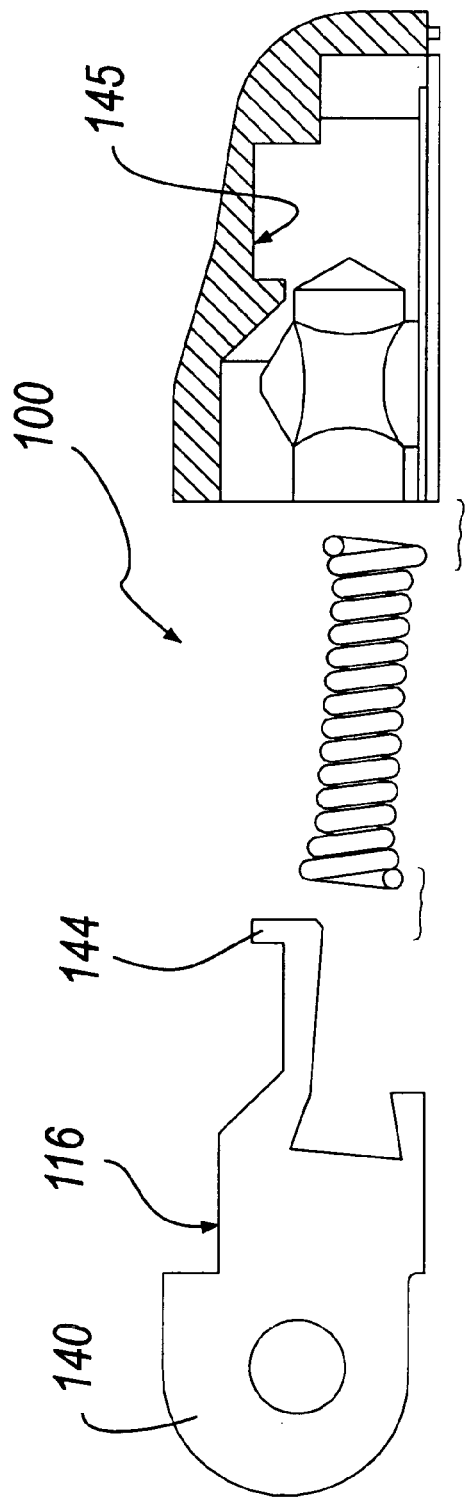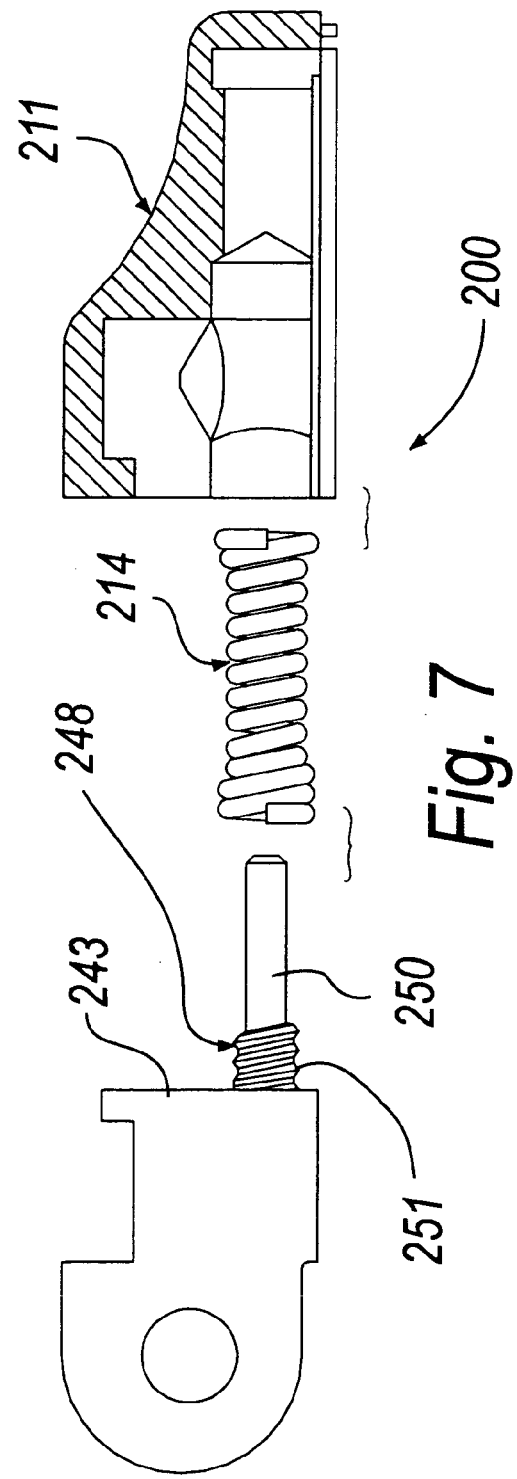

ELASTIC HINGE FOR EYEGLASSES

The present invention relates to an elastic hinge for eyeglasses.

BACKGROUND OF THE INVENTION

Currently used elastic hinges are designed to allow a stable closed position of temples that are folded adjacent to the front of eyeglasses and a stable position for use of the temples arranged at right angles to the front.

Moreover, such elastic hinges must allow a certain overtravel angle for the temples.

Said elastic hinges are of various kinds. One more widely used type is constituted by an elongated box-like body that is provided with a receptacle inside which an elastic element, such as for example a cylindrical helical spring, and a first hinge articulation element, associated with the elastic element, are inserted during an assembly step that follows the welding of the box-like body to the corresponding temple.

The elastic element is retained by a contrast element that is locked within the receptacle.

The first articulation element is arranged so that a guiding portion thereof can slide within the receptacle and protrudes from it through a front opening with its own hinge head.

The first hinge articulation element is further pivoted with said hinge head to a second hinge articulation element, which is rigidly coupled to the front of the frame.

Said second articulation element is of the cam type in order to allow the stable closed and active positions.

The internal parts of this type of hinge are inserted after welding the hollow box-like body to the temple.

This entails the problem that the hinge manufacturer cannot supply it to the user, i.e., the eyeglasses manufacturer, in the assembled condition.

If this hinge were welded already during assembly, the heat that is generated during welding, performed with conventional technologies, and diffuses uniformly throughout the box-like body and its contents, would damage irreparably in particular the spring, which by reannealing would lose its elasticity characteristic.

Other types of hinge that are electrowelded are also known.

Electrowelding, in addition to be impulsive, i.e., lasting for an extremely short time, allows to generate limited heat and to localize said heat only in certain preset points.

These hinges can be welded even when they are assembled and can therefore be supplied in a preassembled condition by the hinge manufacturer to the user.

Hinges of this type are known for example from DE-19856117 or from EP-0679920.

In the first of these two patents, the elastic articulation mechanism of the hinge is inserted in the front hole of a closed box and is retained inside by a guiding cylinder, which is locked by a stud provided on the box.

The second of these two patents describes a box that is open on the bottom, and the problem that arises is that the internal mechanism may escape when the hinge is supplied loose by the manufacturer to the user.

The solution that has been adopted is to create inside the box a shoulder on which the spring of the mechanism acts, said spring being inserted in a compressed condition.

The thrust of the spring and the friction generated between the first turn and the shoulder retain the mechanism within the box even if the box is open.

However, it is evident that this way of retaining the mechanism is not entirely safe, or rather, becomes safer as the compression of the spring increases.

However, the spring cannot be highly compressed, because during operation after assembly one would not have a sufficient further active stroke, also in view of its limited dimensions.

If a particularly hard spring were used to obviate this, one would no longer have a soft operation of the hinge during overtravel of the temples and one would again have more difficulty in preassembling the mechanism, since the spring must be compressed in order to be inserted.

Moreover, it should be noted that the use of springs that act by compression determines the dimensions of the hinges in which they are inserted.

The spring that acts by compression must in fact be inserted in a receptacle whose dimension must be at least equal to the length of the pack of the turns of the spring, plus a length equal to the stroke of the first articulation element of the hinge.

In view of the current requirements of the market, which requires ever smaller and less visible hinges, the dimensions of the spring are a constraint for the overall dimensions of the hinge.

SUMMARY OF THE INVENTION

The aim of the present invention is to overcome the problems linked to retaining inside an open box the mechanism for providing the elastic reaction of a hinge for eyeglasses, allowing its preassembly.

Within this aim, an object of the invention is to not entrust the retention of the mechanism to an elastic action of the spring of the device.

Another object is to provide a preassembled hinge in which a spring is not in a preloaded state caused by and linked to the retention of the mechanism within the box.

Another object is to provide a hinge that can be assembled easily.

Another object of the present invention is to provide a hinge that has reduced dimensions with respect to currently used hinges.

Another object is to provide a hinge that is easy to manufacture and has a low cost.

This aim and these and other objects that will become better apparent hereinafter are achieved by an elastic hinge for eyeglasses, of the type that comprises an elongated box-like body to be welded to the end of a temple, said box-like body being provided with an open receptacle inside which an elastic element and a first hinge articulation element associated with said elastic element are inserted during an assembly step that precedes the welding of the box-like body to the temple, said first hinge articulation element being arranged so that it can slide partially within said receptacle, said first hinge articulation element being further pivoted to a second hinge articulation element to be fixed to the front of the eyeglasses, said hinge being characterized in that said elastic element acts by traction and is locked substantially by a first end on said box-like body and by a second end on said first articulation element, said first and second ends both having a larger diameter than the intermediate body of said elastic element, said box-like body having, in order to provide said receptacle, an opening that is formed on the side to be fixed to said temple and is useful for the insertion of said elastic element in the receptacle, said opening being formed by a longitudinal milling that affects practically the entire length of the box-like body, is slightly wider than the diameter of the intermediate body of said elastic element, and is combined with an axial hole that is parallel to said milling and has a diameter that is slightly larger than the diameter of the ends of said elastic element, which partially affects the milling and is intersected by a hole that is perpendicular to the milling and has a diameter that is larger than the diameter of said first and second ends of said elastic element, an additional wider region suitable to contain the first end of said elastic element being further provided at the end of the milling, the second end of said elastic element, associated with said first articulation element, being accommodated in the end part of said axial hole, where it is positioned during assembly by extending the elastic element and inserting said second end thereof through the hole that lies at right angles to the milling, the length of said elastic element when inactive being substantially equal to the distance between the bottom of said axial hole and the end of said milling.

BRIEF DESCRIPTION OF THE DRAWINGS

Further characteristics and advantages of the present invention will become better apparent from the following detailed description of three preferred but not exclusive embodiments thereof, illustrated by way of non-limiting example in the accompanying drawings, wherein:

FIG. 1 is a top view of a hinge according to the invention, also illustrating a temple portion and a portion for connection to the front of the eyeglasses;

FIG. 2 is a side view of the hinge of FIG. 1;

FIG. 3 is an exploded top view of the hinge of FIG. 1;

FIG. 4 is a front view of the box-like body of the hinge of FIG. 1;

FIG. 5 is an exploded side view of the hinge of FIG. 1;

FIG. 6 is an exploded top view of a second embodiment of a hinge according to the invention;

FIG. 7 is an exploded top view of a third embodiment of a hinge according to the invention.

DESCRIPTION OF THE PREFERRED EMBODIMENTS

With reference to the figures, an elastic hinge for eyeglasses according to the invention is generally designated by the reference numeral 10.

A first embodiment of the hinge 10 is described with particular reference to FIGS. 1 to 5.

The hinge 10 is of the type that comprises an elongated box-like body 11 to be welded to the end of a temple, which is schematically designated by the reference numeral 12 in the figures.

The box-like body 11 is provided with an open receptacle 13, inside which an elastic element 14, such as for example a cylindrical helical spring 15 and a first hinge articulation element 16 associated with the elastic element 14, are inserted during a step of assembly that precedes the welding of the box-like body 11 to the temple 12.

The cylindrical helical spring 15 is of the type that is "packed" (i.e., has mutually adjacent contiguous turns) when it is inactive.

The first articulation element 16 is arranged, with a guiding portion thereof, so that it can slide inside the receptacle 13.

The hinge articulation element 16 is further pivoted to a second hinge articulation element 17 to be fixed to the front of the eyeglasses, which is not designated by a reference numeral in the figures for the sake of simplicity.

The elastic element 14 is substantially locked by a first end 20 on the box-like body 11 and by a second end 21 on the first articulation element 16, as described in greater detail hereinafter.

The elastic element 14 acts by traction between the box-like body 11 and the first articulation element 16.

The first end 20 and the second end 21 of the elastic element 14 both have a larger diameter than the intermediate body of the elastic element 14.

In particular, with reference to the cylindrical helical spring 15, the turns of the first and second ends 20 and 21 of said spring have a larger diameter than the intermediate body of said spring.

The box-like body 11 has, in order to form the receptacle 13, an opening 25 that is formed on the side to be fixed to said temple and is useful for the insertion of the elastic element 14 in said receptacle.

The opening 25 is formed by a longitudinal milling 26 that practically affects the entire length of the box-like body 11 and is slightly wider than the diameter of the intermediate body of the elastic element 14.

The milling 26 is combined with an axial hole 27, which is parallel to the milling 26 and has a diameter that is slightly larger than the diameter of the ends 20 and 21 of the elastic element 14.

The axial hole 27 partially affects the milling 26 and intersects a hole 28 that is perpendicular to the milling 26.

The hole 28 that is perpendicular to the milling 26 has a larger diameter than the ends 20 and 21 of the elastic element 14.

At the end 26a of the milling 26 there is an additional wider portion 30, which has for example a conical shape and is suitable to contain the first end 20 of the elastic element 14.

The second end 21 of the elastic element 14, which is associated with the first articulation element 16, is accommodated in the end part 31 of the axial hole 27, where it is positioned during assembly by elongating the elastic element 14, inserting its second end 21 through the hole 28 at right angles to the milling 26 and then releasing it.

The length of the elastic element 14 when inactive is substantially equal to the distance between the bottom of the end part 31 of the axial hole 27 and the end 26a of the milling 26.

In this manner, the elastic element 14, once inserted in the receptacle 13 (so that the second end 21 is accommodated in the end part 31 of the axial hole 27), is prevented from escaping from it by way of the opening of the end part 31, which is narrower than the diameter of the second end 21 of the elastic element 14; in practice, the second end 21 is undercut with respect to the opening 25.

The first hinge articulation element 16 has a hinge head 40 on which there is a hole 41 for the passage of the pivot 42 for pivoting to the second hinge articulation element 17.

A secondary body 43 for sliding within the receptacle 13 extends from the head 40.

A stroke limiting tab 44 is formed on the secondary body 43 and is arranged so that it can slide on a through pocket 45 formed inside the box-like body 11; the through pocket 45 is delimited laterally by first and second stroke limiting abutment surfaces 46 and 47.

In this first embodiment, the stroke-limiting tab 44 is formed in a substantially central position of the first hinge articulation element 16.

A locking contoured portion 48 for the second end 21 of the elastic element 14 is formed on the secondary body 43.

In this first embodiment of the invention, the locking contoured portion 48 is constituted by a recess 49 that duplicates the shape of the second end 21 of the elastic element 14, which remains engaged once it is inserted.

The axis of the recess 49, in the illustrated version, is inclined with respect to the interface surface between the temple 12 and the box-like body 11, so that the second end 21 of the elastic element 14 is further spaced from the temple 12 than the first end 20.

Along the longitudinal extension of the box-like body 11, laterally to the opening 25, there are two longitudinal ribs 52 for welding the box-like body 11 to the temple 12.

In a second embodiment, shown in FIG. 6 and designated by the reference numeral 100, said stroke limiting tab, designated here by the reference numeral 144, is formed in a substantially terminal portion of the first hinge articulation element, designated here by the reference numeral 116, on the opposite side with respect to the head 140.

The stroke limiting tab 144 is arranged so that it can slide on a corresponding through pocket, which is designated here by the reference numeral 145.

In a third embodiment, illustrated in FIG. 7 and designated by the reference numeral 200, the secondary body, here designated by the reference numeral 243, has a preferably cylindrical tab 250 that is extended longitudinally toward the inside of the box-like body 211.

The spring 214 is fitted on the tab 250 and is locked by the second end 221 on a contoured portion 248, which conveniently has a thread 251.

The usefulness of a hinge structure thus described is particularly evident during assembly.

With reference to the first embodiment 10, the operating steps for assembling the hinge are in fact as follows.

The second end 21 of the spring 15 is coupled to the locking contoured portion 48 formed on the first articulation element 16.

At this point, with the spring 15 slightly flexed, the first end 20 of the spring 15 is inserted in the additional enlarged portion 30.

The spring 15 is subjected to traction by moving the first articulation element 16 away from the enlarged portion 30.

At this point, the spring is under traction by an amount such that the second end 21 is inserted within the hole 28.

At the same time, the first articulation element 16 is inserted in the receptacle 13, moving the sliding tab 44 into the corresponding pocket 45.

By releasing the first articulation element 16 and therefore eliminating traction on the spring 15, said spring contracts, returning to the inactive position.

At this point, the second end 21 is inserted within the end part 31 of the hole.

The end part 31 is undercut with respect to the opening 25 and therefore the spring 15 remains inside the box-like body 11 without being able to exit.

In this manner, the box-like body 11, containing the assembly constituted by the spring and the first articulation element 16, can be handled easily without particular precautions.

In practice it has been found that the invention thus described solves the problems noted in known types of elastic hinge for eyeglasses; in particular, the present invention provides an elastic hinge for eyeglasses that allows stable preassembly of the components of the hinge.

Further, the fact of using a cylindrical helical spring that is packed when inactive (i.e., has contiguous mutually adjacent turns when it is inserted, in the inactive condition, in the receptacle) and therefore acts by traction allows to choose said spring so that it has smaller dimensions than in hinges that use springs that act by compression, thus reducing the overall dimensions of the hinge.

In the case of springs that act by compression, the maximum stroke of the hinge is in fact constrained by the dimensions of the spring when it is pushed into the packed configuration: given a certain stroke of the hinge, the spring is compressed from a certain position (in the extreme case, the inactive position) until it is shortened as much as possible into a pack; the length of the spring is determined by the length of the pack of turns plus a shortening portion caused by the stroke of the hinge, plus an optional preloading against a shoulder in order to ensure accommodation within the box-like body.

In the case of the present invention, the spring instead starts from a given length, which corresponds to the length of the packed spring, and can elongate indefinitely (in the extreme case, until the turns are extended); in this manner, it is possible to choose a spring that has smaller dimensions (with similar elastic characteristics).

In this manner, the overall dimensions of the hinge are reduced, meeting a market requirement that demands ever smaller and less visible hinges.

The invention thus conceived is susceptible of numerous modifications and variations, all of which are within the scope of the appended claims; all the details may further be replaced with other technically equivalent elements.

In practice, the materials employed, so long as they are compatible with the specific use, as well as the dimensions, may be any according to requirements and to the state of the art.

The disclosures in Italian Patent Application No. PD2003A000117 from which this application claims priority are incorporated herein by reference.

What is claimed is:

1. An elastic hinge for eyeglasses, comprising: an elongated box-like body to be welded to an end of an eyeglass temple, said box-like body being provided with an open receptacle; an elastic element; a first hinge articulation element connected with said elastic element, both of which are inserted in said open receptacle during assembly preceding welding of the box-like body to the temple, said first hinge articulation element being arranged so as to be partially slideable within said receptacle; a second hinge articulation element to be fixed to a front of the eyeglasses; said first hinge articulation element being further pivoted to said second hinge; and wherein said elastic element is adapted to act by traction and is locked substantially with a first end thereof at said box-like body and with a second end thereof at said first articulation element, said first and second ends of the elastic element both having a larger diameter than an intermediate body part thereof, and wherein said box-like body has an opening that is formed on a side thereof to be fixed to said temple and provides said receptacle for insertion of said elastic element, said opening being formed by a longitudinal milling that extends substantially over an entire length of the box-like body, is slightly wider than a diameter of the intermediate body of said elastic element, and is provided with an axial hole that is parallel to said milling and has a diameter that is slightly larger than a diameter of said first and second ends of said elastic element, which partially extends in said milling, said axial hole being intersected by a perpendicular hole that is perpendicular to said milling and has a diameter that is larger than the diameter of the ends of said elastic element; and wherein an additional wider region suitable to contain said first end of said elastic element is further provided at an end of said milling, said second end of said elastic element, locked at said first articulation element, being accommodated in an end part of said axial hole, where it is positioned during assembly by extending the elastic element and inserting said second end thereof through said perpendicular hole that lies at right angles to the milling, a length of said elastic element, when inactive, being substantially equal to a distance between a bottom of said axial hole and said end of said milling.

2. The elastic hinge for eyeglasses of claim 1, wherein said first hinge articulation element is provided with a hinge head having a hole thereon for passage of a pivot for pivoting thereof to said second hinge articulation element, with a secondary body for sliding within said receptacle that protrudes from said head, a stroke limiting tab being formed on said secondary body and being arranged so as to be slideable on a through pocket that is formed inside said box-like body, said through pocket being formed laterally by first and second stroke limit abutment surfaces of said receptacle, and a locking contoured portion for said second end of said elastic element being formed on said secondary body.

3. The elastic hinge for eyeglasses of claim 2, wherein said locking contoured portion is constituted by a recess that is shaped complementarily to said second end of said elastic element.

4. The elastic hinge for eyeglasses of claim 3, wherein said recess is provided with an axis thereof that is inclined with respect to an interface surface between the temple and said box-like body, so that said second end of said elastic element is further distant from the temple than said first end.

5. The elastic hinge for eyeglasses of claim 2, wherein said secondary body has a tab that is preferably cylindrical and extends longitudinally inside said box-like body, said contoured portion being formed on said tab and being constituted by a thread.

6. The elastic hinge for eyeglasses of claim 2, wherein said stroke-limiting tab is formed in a substantially central position of said first hinge articulation element.

7. The elastic hinge for eyeglasses of claim 2, wherein said stroke limiting tab is formed in a substantially terminal position of said first hinge articulation element, on an opposite side with respect to said head.

8. The elastic hinge for eyeglasses of claim 2, wherein said additional enlarged portion has a conical shape.

9. The elastic hinge for eyeglasses of claim 1, wherein said elastic element is constituted by a cylindrical helical spring.

10. The elastic hinge for eyeglasses of claim 9, wherein said cylindrical helical spring has, at said first and second ends thereof, turns that have a larger diameter than said intermediate body of said elastic element constituted by the cylindrical helical spring.

11. The elastic hinge for eyeglasses of claim 1, further comprising welding ribs provided on said box-like body.

12. The elastic hinge for eyeglasses of claim 11, wherein said welding ribs are arranged along a longitudinal extension of said box-like body, respectively, on opposite sides of said opening.

* * * * *